Feb. 3, 1925.

H. R. DOWNEY

AUTOMATIC REDUCING AND DIRECT DRIVE GEAR

Filed Jan. 10, 1923

Inventor
Hugh R. Downey,

By

Attorney

Feb. 3, 1925. 1,525,279
H. R. DOWNEY
AUTOMATIC REDUCING AND DIRECT DRIVE GEAR
Filed Jan. 10, 1923 2 Sheets-Sheet 2

Inventor
Hugh R. Downey,
By
Attorney

Patented Feb. 3, 1925.

1,525,279

UNITED STATES PATENT OFFICE.

HUGH R. DOWNEY, OF BROKEN BOW, NEBRASKA.

AUTOMATIC REDUCING AND DIRECT DRIVE GEAR.

Application filed January 10, 1923. Serial No. 611,759.

*To all whom it may concern:*

Be it known that I, HUGH R. DOWNEY, a citizen of the United States, residing at Broken Bow, in the county of Custer and State of Nebraska, have invented new and useful Improvements in Automatic Reducing and Direct Drive Gears, of which the following is a specification.

The invention relates to an automatic reducing and direct drive gear.

The object of the present invention is to provide a simple, practical and efficient drive gear designed for use on an automobile either for cranking the engine or for operating a generator but adapted for various other applications where similar driving mechanism is desired and capable, when the generator operates as a motor, of automatically throwing into operation reducing gear, and when the engine starts and drives the generator of automatically cutting out the reducing gear and thereby enabling the engine to directly drive the generator without any intermediate gearing, whereby in a gear of this character a generator of a minimum size, but of sufficient power, may be employed.

A further object of the invention is to provide a gear drive of this character in which the gears will at all times be in full mesh thereby eliminating any chance of stripping or breaking the gears when the device is automatically shifted.

Another object of the invention is to equip the device with shock absorbing means adapted to yieldably subject the generator, when acting as a motor, to the load both to reduce the peak flow from the storage battery and relieve the gear of sudden strain so that the engine may be started in a smooth and easy manner with a minimum expenditure of power.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 1:
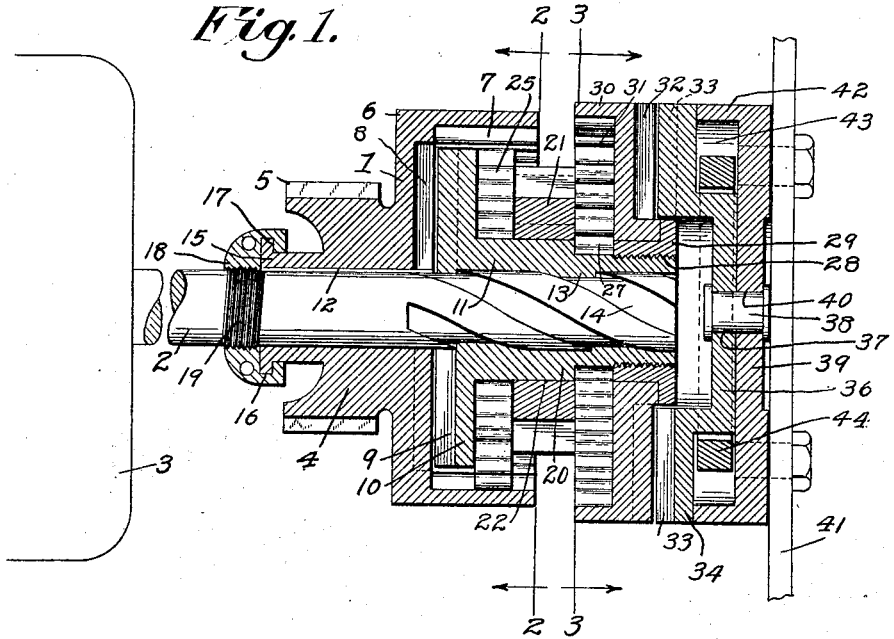
Figure 1 is a horizontal sectional view of an automatic reducing and direct drive gear, constructed in accordance with this invention.
Figure 2:
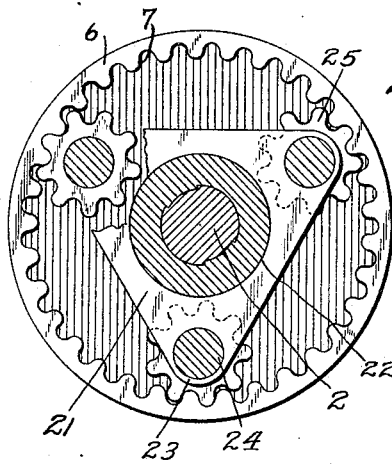
Figure 2 is a transverse sectional view on the line 2—2 of Figure 1.
Figure 7:
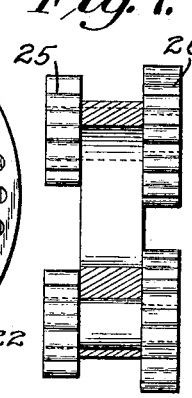
Figure 7 is a detail sectional view of the planetary gear frame, illustrating the manner of mounting the differential gears on the same.
Figure 3:
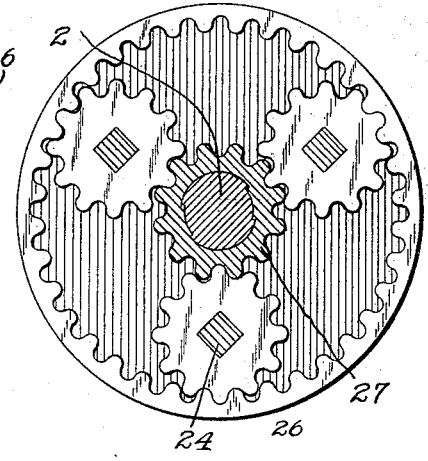
Figure 3 is a similar view on the line 3—3 of Figure 1.
Figure 4:
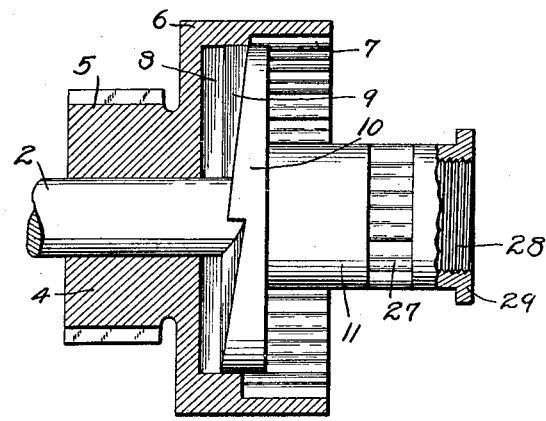
Figure 4 is a detail view of the slidable member and the combined gear and clutch member, which is connected with the crank shaft of the engine.
Figure 6:
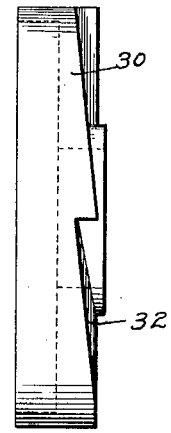
Figures 5 and 6 are detail views of the combined internal gear and clutch member.
Figure 5:
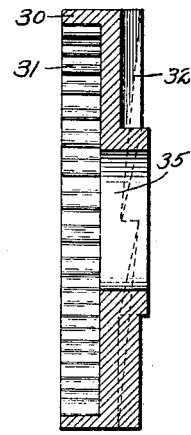
Figures 8, 9:
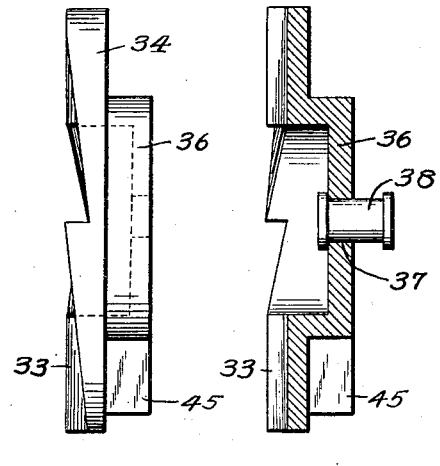
Figures 8, 9 and 10 are detail views of the pivotally mounted clutch member.
Figure 11:
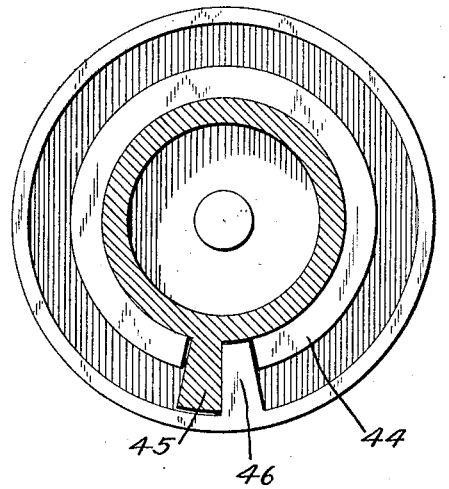
Figure 11 is a detail view of the end supporting member, illustrating the arrangement of the spring buffer or cushion.
Figure 10:
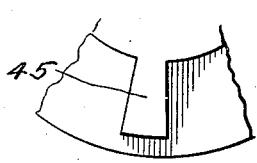

In the accompanying drawings, in which is illustrated the preferred embodiment of the invention, 1 designates a combined gear element and clutch member loosely mounted for rotation on a shaft 2 of a starter motor and generator 3, but while the combined gear element and clutch member is illustrated in the drawings as being directly mounted on the shaft of the motor and generator, it will be readily understood that it may be connected with the motor and generator in any other desired manner. The rotary gear element 1 is provided with an integral reduced portion 4 provided with teeth 5 and constituting a gear or pinion which is connected with the engine (not shown) by a crank and which is also driven by the engine after the latter has been started. The gear element is also provided with a hollow cylindrical body portion 6 having on the interior of its periphery teeth 7 which form an internal gear, and the said body portion is provided with an interior clutch face 8 of ratchet formation adapted to engage with a corresponding clutch face 9 of an enlarged portion or head 10 of a slidable member 11, whereby the latter is directly connected to or interlocked with the rotary gear element 1 for driving the shaft 2 and operating the generator directly from the engine without the employment of intermediate gearing for transmitting the rotary motion from the gear element to the generator. The gear element 1 is provided with a central opening 12 for the reception of the shaft 2 and the slidable member 11 is in the form of a sleeve and is provided with an interior left-hand spiral rib 13 constituting a thread for engaging a correspondingly shaped spiral groove 14 formed in the shaft 2 and operating as a left-hand thread or screw for actuating the slidable member, whereby the same is caused to move inwardly or outwardly accordingly as the same is rotated interiorly or exteriorly. The gear element 1 is provided with a hub extension 15 having an exterior annular flange 16 which is interlocked with a groove 17 in a collar or clamp 18 mounted on a threaded portion 19 of the shaft 2 and adapted to hold the gear element 1 against movement longitudinally of the shaft while permitting the gear element to rotate freely on the shaft to operate the mechanism hereinafter described.

The slidable member 11 is provided with an intermediate bearing portion 20 on which is mounted, for relative rotary movement, a planetary transmission frame 21, preferably of triangular shape having a central opening 22 for the reception of the said bearing portion of the slidable member and provided at its outer portions with bearing openings 23 for the reception of short shafts 24 provided at their ends with pinions or gears 25 and 26 of different diameters. The pinions or gears 25 and 26 are located at the opposite faces of the frame 21 and the smaller pinions 25 mesh with the internal gear 7 of the rotary gear element 1, while the larger pinions 26 mesh with a gear 27 formed by teeth cut in the exterior of the slidable member 11. The slidable member 11 is exteriorly threaded at its outer end 28 and has mounted on it a flanged collar or nut 29 which receives and rotates on the outer end of the slidable member a combined internal gear and clutch 30. The gear member 30 is provided at its inner face with an annular flange having interior teeth 31 forming an internal gear, and the said member 30 is provided at its opposite side with an outer clutch face 32 of ratchet formation adapted to coact with a ratchet clutch face 33 of a pivoted clutch member 34. The rotary clutch member 30 is provided with a central opening 35 to fit the cylindrical nut or collar 29 and the pivoted clutch member 34 is provided with a hollow reduced central or cylindrical portion or hub 36 having a central opening 37 for the reception of a pivot 38, which is preferably in the form of a rivet and which pivotally connects the clutch member 34 to a cylindrical end section 39 having a central opening 40 to receive the said pivot 38 and designed to be rigidly secured to a fixed portion 41 of an automobile or other structure. The fixed cylindrical end member is provided with a peripheral flange or portion 42, which fits against the outer portion of the pivoted clutch member and which is spaced from the inner central portion thereof to provide an annular space 43 for the reception of a spring 44 of circular formation having its ends slightly separated and fitting against radial lugs 45 and 46 of the pivoted clutch member and the fixed cylindrical section. The lugs, which are interposed between the ends of the spring, constitute a fixed stop for the pivoted clutch section for holding the same against movement in counter-clockwise direction and the spring forms a flexible or yieldable connection between the pivoted clutch member and the fixed section to permit a limited cushioned pivotal or rotary movement of the clutch member 34 in a clockwise direction. This will cushion the cranking of the engine by the generator and relieve the gearing of strain in such operation.

When power is applied to the generator for operating the same as a motor to start the engine, the shaft 2 is rotated in an anti-clockwise direction causing the slidable member 11 to move forwardly or outwardly out of engagement with the ratchet face of the gear element 1 and carrying the clutch face of the combined clutch and internal gear member 30 into engagement with the clutch face of the pivoted member, thus holding the said member 30 against clockwise rotation. The slidable member 11 being rotated in the said counter-clockwise direction by the shaft 2 transmits through its gear 27 a clockwise rotary movement to the large pinions 26 which, owing to the locking or holding of the internal gear member 30 against movement, are caused to travel around the same. This rotary movement of the large pinions 26 is communicated to the smaller pinions 25 which, owing to their smaller diameter, rotate the gear element 1 at a reduced speed. The rotary movement of the gear element 1 operates to crank the engine in the usual manner and when the engine starts the rotation of the crank shaft transmits rotary motion to the gear element 1, which rotates the slidable member in a counter-clockwise direction on the shaft 2 and causes the said slidable member to disengage the internal gear member 30 from the pivoted clutch member and to engage the clutch face 9 of the slidable member with the clutch face 8 of the gear element 1, whereby the gear element 1 is directly locked to the generator shaft and will cause a direct rotation of the generator shaft without the operation of the intermediate reducing gears which are automatically thrown into operation when the engine is cranked. The positive automatic operation of the reducing gears permits the use of much smaller single unit starter generator systems as it requires less energy from the storage battery of the system. The positive automatic operation of the direct drive between the gear element 1 and the generator shaft enables a generator of the actually required size to be employed for furnishing the required amount of current and the generator does not have to be increased in power beyond such actual requirement to enable it to crank the engine owing to the reducing gear which is automatically brought into operation during the cranking action.

What is claimed is:—

1. A drive gear of the class described, including a shaft having a spiral thread and designed to be connected with a generator, a gear element mounted on the shaft and having a clutch face, an outer clutch member, a slidable member mounted on the shaft and having means for engaging the thread thereof for causing a sliding movement of the member by relative rotary movement of the shaft and the member, a gear element carried by the slidable member and having means for engaging the outer clutch member, said slidable member being provided with means for engaging and interlocking it with the gear element of the shaft, and reducing gear carried by the slidable member and meshing with the said gear elements and carried into and out of operation by the sliding movement of the said slidable member.

2. A drive gear of the class described, including a shaft designed to be connected with the generator, a gear element mounted on the shaft for connection with the crank shaft of an engine, a slidable member mounted on the shaft, said slidable member and gear element having coacting clutch portions, an outer clutch member, a gear element carried by the slidable member and arranged to engage the outer clutch member, reducing gearing meshing with the said gear elements and carried by the slidable member, and means operated by the relative rotary movement of the slidable member and the shaft for moving the slidable member inwardly and outwardly to engage the gear element of the slidable member with the outer clutch member and simultaneously carrying the slidable member out of engagement with the gear element of the shaft and for disengaging the gear element of the slidable member from the outer clutch member and simultaneously carrying the slidable member into engagement with the gear element of the shaft to throw the reducing gear into operation when power is applied to the shaft and for affording a direct connection between the shaft and the gear element thereof when power is applied to the latter.

3. A drive gear of the class described, including a shaft, a gear element mounted on the shaft and having a pinion for connection with the crank shaft of an engine and provided also with an internal gear, a slidable member mounted on the shaft, said slidable member and gear element having co-acting clutch portions, an internal gear mounted on the slidable member, planetary gearing meshing with the slidable member and having pinions of different diameters meshing respectively with the gear element of the shaft and the gear element of the slidable member, an outer clutch member arranged to engage the gear element of the slidable member, and means for automatically moving the slidable member inwardly and outwardly to engage the same with the gear element of the shaft and disengage it therefrom and to carry the gear element of the slidable member into and out of engagement with the outer clutch member.

4. A drive gear of the class described, including a shaft, a gear element mounted on the shaft and having a pinion for connection with the crank shaft of an engine and provided also with an internal gear, a slidable member mounted on the shaft, said slidable member and gear element having co-acting clutch portions, an internal gear mounted on the slidable member, planetary gearing meshing with the slidable member and having pinions of different diameters meshing respectively with the gear element of the shaft and the gear element of the slidable member, an outer pivoted clutch member arranged to be engaged by the gear element of the slidable member, means for cushioning the pivotal movement of the outer clutch member, and means for moving the slidable member inwardly and outwardly to carry the same into and out of engagement with the gear element of the shaft and to carry the gear element of the slidable member into and out of engagement with the pivoted clutch member.

5. A drive gear of the class described, including a shaft, a gear element mounted on the shaft and having a pinion for connection with the crank shaft of an engine and provided also with an internal gear, a slidable member mounted on the shaft, said slidable member and gear element having co-acting clutch portions, an internal gear mounted on the slidable member, planetary gearing meshing with the slidable member and having pinions of different diameters meshing respectively with the gear element of the shaft and the gear element of the slidable member, a pivoted clutch member arranged to be engaged by the gear element of the slidable member, means for cushioning the pivotal movement of the clutch member in one direction, means for rigidly limiting the pivotal movement of the clutch member in the opposite direction, and means for moving the slidable member inwardly and outwardly to engage it with and disengage it from the gear element of the shaft and to carry the gear element of the slidable member into and out of engagement with the pivoted clutch member.

6. A drive gear of the class described, including a shaft, a gear element mounted on the shaft and having a pinion for connection with the crank shaft of an engine and provided also with an internal gear, a slidable member mounted on the shaft, said slidable member and gear element having co-acting clutch portions, an internal gear mounted on the slidable member, planetary gearing meshing with the slidable member and having pinions of different diameters meshing respectively with the gear element of the shaft and the gear element of the slidable member, a pivoted clutch member arranged to be engaged by the gear element of the slidable member and provided with a lug, a fixed section having a lug arranged in the path of the lug of the pivoted clutch member, a spring having its terminal portions engaged with the said lugs and adapted to cushion the pivotal movement of the clutch member in one direction, and means for moving the slidable member inwardly and outwardly on the shaft to engage it with and disengage it from the gear element of the shaft and to carry the gear element of the slidable member into and out of engagement with the clutch member.

7. A drive gear of the class described, including a shaft, a gear element mounted on the shaft and having a pinion for connection with the crank shaft of an engine and provided also with an internal gear, a slidable member mounted on the shaft, said slidable member and gear element having co-acting clutch portions, an internal gear mounted on the slidable member, planetary gearing meshing with the slidable member and having pinions of different diameters meshing respectively with the gear element of the shaft and the gear element of the slidable member, a pivoted clutch member arranged to be engaged by the gear element of the slidable member and having a reduced central portion, a fixed cylindrical section having an annular flange spaced from the central portion of the pivoted clutch member to provide an interior annular space, a curved spring arranged within the said space and engaged by the pivoted clutch member and the fixed section, and means for moving the slidable member inwardly and outwardly.

8. A drive gear of the class described, including a shaft, a gear element mounted on the shaft and adapted to be connected with the crank shaft of an engine, said gear element being provided with an interior clutch face and having an internal gear, a slidable member mounted on the shaft and having a clutch face adapted to engage the clutch face of the gear element, said slidable member being provided with a gear, an internal gear element mounted on the slidable member and provided at its outer side with a clutch face, a rotary support mounted on the slidable member and provided with bearings, shafts journaled in the bearings, gears of different diameters arranged in pairs and carried by the said shafts and meshing with the said internal gear and with the internal gear element, the pinions meshing with the latter and also meshing with the gear of the slidable member, an outer clutch member arranged to be engaged by the internal gear element, and means for moving the slidable member inwardly and outwardly.

9. A drive gear of the class described, including a shaft, a gear element mounted on the shaft and adapted to be connected with the crank shaft of an engine, said gear element being provided with an interior clutch face and having an internal gear, a slidable member mounted on the shaft and having a clutch face adapted to engage the clutch face of the gear element, said slidable member being provided with a gear, an internal gear element mounted on the slidable member and provided at its outer side with a clutch face, a rotary support mounted on the slidable member and provided with bearings, shafts journaled in the bearings, gears of different diameters arranged in pairs and carried by the said shafts and meshing with the said internal gear and with the internal gear element, the pinions meshing with the latter and also meshing with the gear of the slidable member, an outer clutch member arranged to be engaged by the internal gear element, and means for automatically moving the slidable member inwardly and outwardly, said means including a threaded connection between the slidable member and the shaft.

10. A drive gear of the class described, including a shaft, a gear element mounted on the shaft and adapted to be connected with the crank shaft of an engine, said gear element being provided with an interior clutch face and having an internal gear, a slidable member mounted on the shaft and having a clutch face adapted to engage the clutch face of the gear element, said slidable member being provided with a gear, an internal gear element mounted on the slidable member and provided at its outer side with a clutch face, a rotary support mounted on the slidable member and provided with bearings, shafts journaled in the bearings, gears of different diameters arranged in pairs and carried by the said shafts and meshing with the said internal gear and with the internal gear element, the pinions meshing with the latter and also meshing with the gear of the slidable member, an outer clutch member arranged to be engaged by the internal gear element, means for moving the slidable member inwardly and outwardly, means for pivotally mounting the outer clutch member, and means for cushioning the pivotal movement in one direction and for rigidly limiting the movement of the pivotal member in the opposite direction.

In testimony whereof I have hereunto set my hand.

HUGH R. DOWNEY.